Sept. 11, 1956 V. D. POLHEMUS ET AL 2,762,445
LEAF SPRING SUSPENSION FOR VEHICLES
Filed June 4, 1952 5 Sheets-Sheet 1
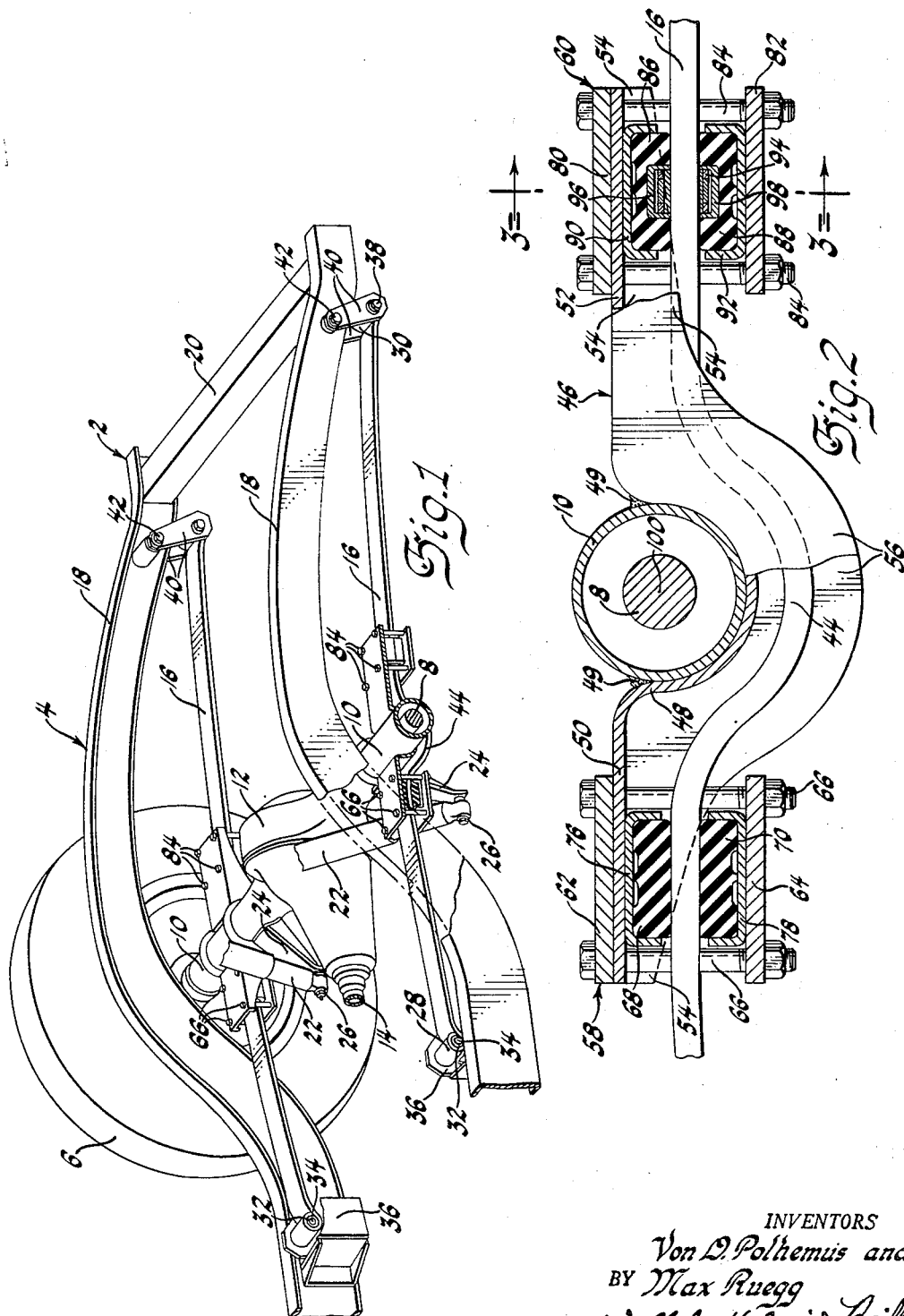
INVENTORS
Von D. Polhemus and
BY Max Ruegg
Willis, Helmig & Baillie
ATTORNEYS Sept. 11, 1956 V. D. POLHEMUS ET AL 2,762,445
LEAF SPRING SUSPENSION FOR VEHICLES
Filed June 4, 1952 5 Sheets-Sheet 2

INVENTORS
Von D. Polhemus and
BY Max Ruegg
Willits, Helwig & Baillio
ATTORNEYS

Sept. 11, 1956 V. D. POLHEMUS ET AL 2,762,445
LEAF SPRING SUSPENSION FOR VEHICLES
Filed June 4, 1952 5 Sheets-Sheet 3
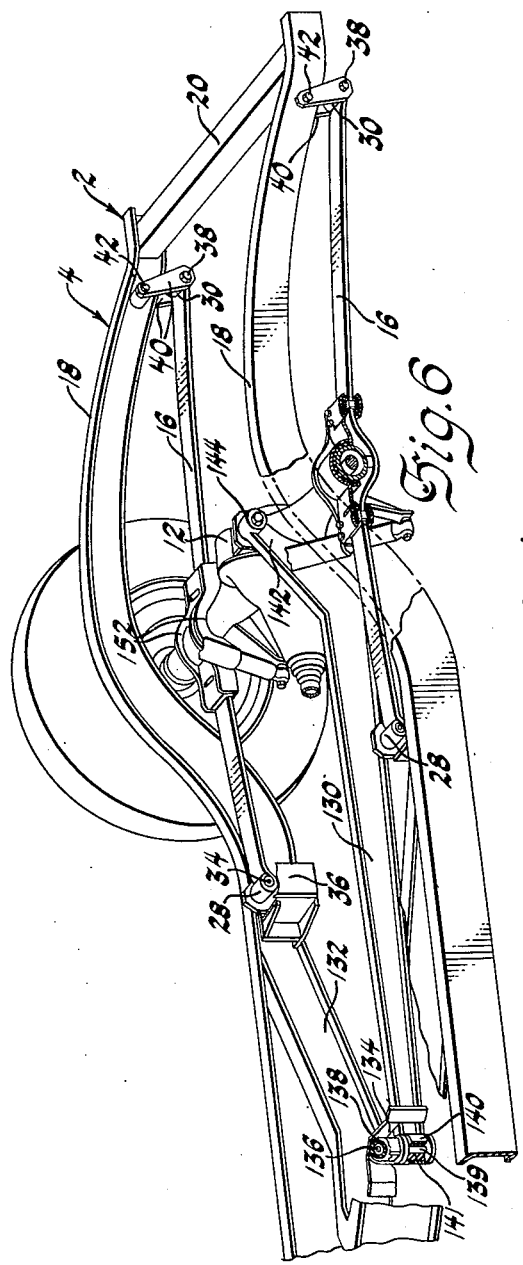
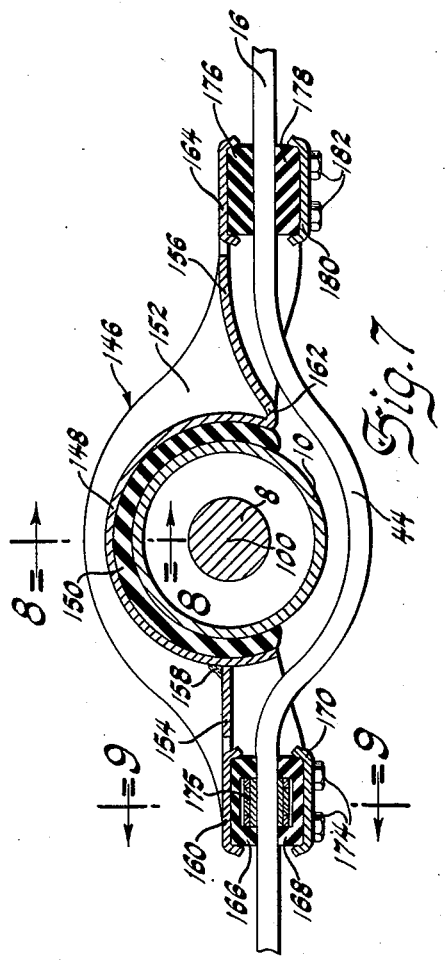
INVENTORS
Von D. Polhemus and
BY Max Ruegg
Willits, Helwig & Baillio
ATTORNEYS Sept. 11, 1956  V. D. POLHEMUS ET AL  2,762,445
LEAF SPRING SUSPENSION FOR VEHICLES
Filed June 4, 1952  5 Sheets-Sheet 4

INVENTORS
Von D. Polhemus and
BY Max Ruegg
Willits, Helwig & Baillio
ATTORNEYS

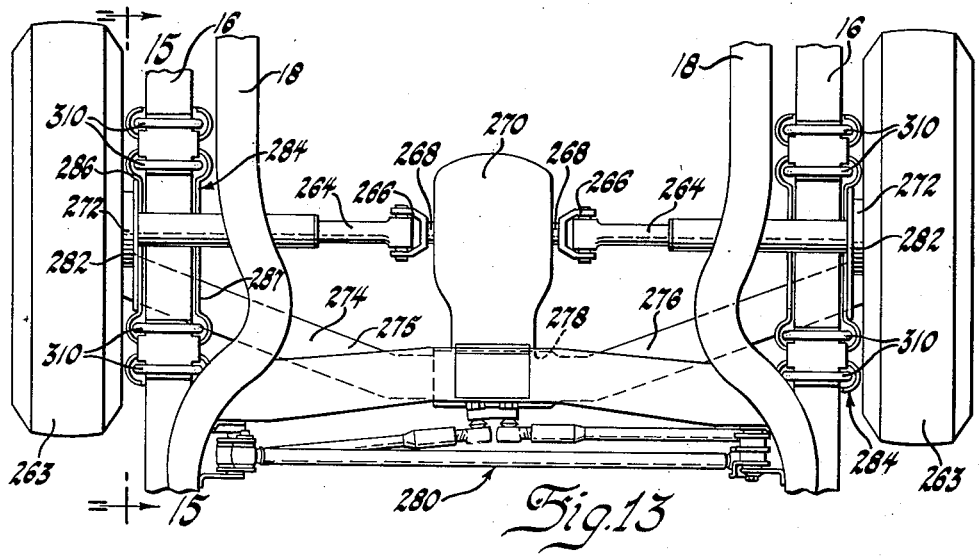
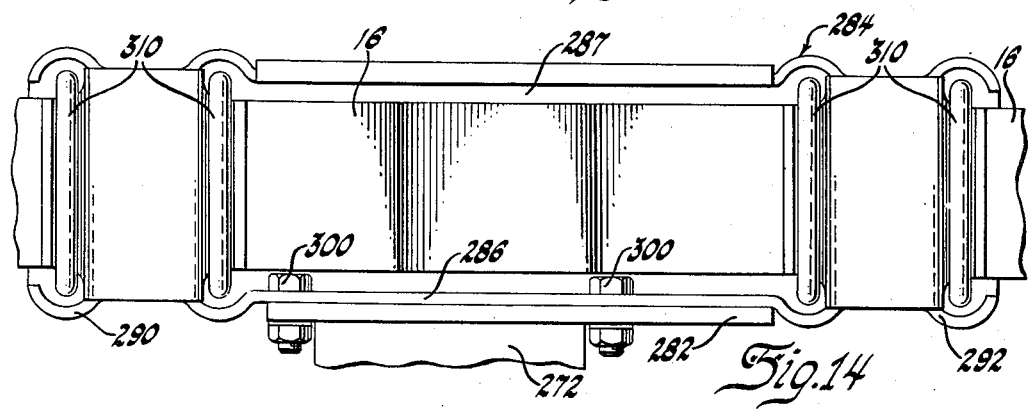
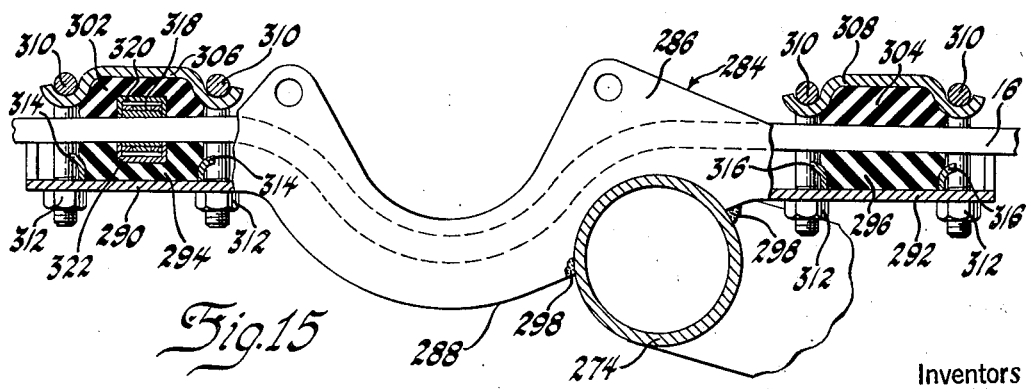

United States Patent Office 2,762,445
Patented Sept. 11, 1956

2,762,445
LEAF SPRING SUSPENSION FOR VEHICLES

Von D. Polhemus, Franklin, and Max Ruegg, Detroit, Mich., assignors to General Motors Corporation, Detroit, Mich., a corporation of Delaware Application June 4, 1952, Serial No. 291,616

11 Claims. (Cl. 180—73)

This invention relates to load supporting or suspension springs and to the means for mounting such springs on the axle housings or other wheel supporting members of motor vehicles.

During operation of vehicles, over bumpy or uneven roads, when making turns in either direction and also when starting or stopping suddenly, the suspension springs thereof are subjected to abnormally great lateral, fore-and-aft and torsional loads. Suspension springs of the leaf type employed heretofore have been mounted either above or below the associated axle housing thereby producing a substantial moment arm extending from the axis of said housing to the point of attachment of the spring thereto. As a result wind up of the spring and axle housing occurs which produces undesirable power and brake hop of the axle housing. Attempts have been made to decrease such windup by increasing the stiffness of the spring mounting but this has, in most cases, produced undesirable changes in the vertical or ride rate of the spring.

One object of the present invention is to provide a simplified and highly improved spring construction for vehicles which minimizes or eliminates the undesirable features associated with spring suspensions employed heretofore.

Another object is to provide a spring which is so constructed and attached to the axle housing of the vehicle that the drive and brake forces, the fore-and-aft inertia forces and the lateral forces operate substantially in a plane passing or nearly passing through the neutral axis of said spring.

Another object is to provide a spring suspension for vehicles wherein the spring and axle housing windup is reduced to a minimum without changing the vertical or ride rate of the spring.

A further object is to provide a leaf spring for vehicle suspensions wherein the neutral axis of the spring over the major portion of the length thereof substantially intersects the axis of the axle housing.

A still further object is to provide a leaf spring for a vehicle suspension which is attached by clamp means at relatively widely spaced points at either side of the axle housing, said spring having a loop portion provided therein between the said points of attachment and said axle housing disposed in spaced relation with the latter and wherein the neutral axis of the spring over the major portion of the length thereof substantially intersects the axis of the said axle housing.

A still further object is to provide a spring which is attached at spaced points to a bracket secured to the axle housing and so constructed as to provide a loop about a portion of the axle housing between the points of attachment, the loop being disposed in spaced relation with the axle housing whereby substantially the entire length of the spring is effective to resiliently support the load.

A still further object is to provide a spring which is attached to the axle housing at widely spaced points disposed at either side of said housing thereby increasing the wind up and lateral stiffness of the assembly without impairing the ride motions of the spring.

A still further object is to provide a mounting for a leaf spring suspension which so locates the roll center of the vehicle as to reduce the forced or resonant and side-shake motion of the axle assembly.

A still further object is to provide a spring and means for mounting the spring to the axle of the vehicle which are so constructed and arranged that the fore-and-aft thrust is directed substantially in a line which intersects the axis of the axle housing whereby the spring is placed in compression and the tendency to bend the said spring at the point of attachment to said mounting is greatly reduced, if not eliminated.

Other and further objects will become apparent as the description of the invention progresses.

Of the drawings:

Fig. 1 is a perspective view, partly in section, of the rear portion of the chassis of a vehicle showing the spring suspension associated therewith, certain parts being broken away to more clearly show certain features thereof.

Fig. 2 is a side elevational view of a portion of the spring and the means for securing it to the axle housing, certain parts being shown in section and other parts being broken away to more clearly illustrate the structure of certain parts thereof.

Fig. 6 is a perspective view, partly in section, of the rear portion of the chassis of the vehicle showing a spring suspension associated therewith of a further modified construction.

Fig. 7 is an enlarged view, partly in section, of a portion of the spring shown in Fig. 6 and the means for attaching the latter to the axle housing of the vehicle.

Fig. 13 is a fragmentary plan view of spring and mounting means therefor of a still further modified construction.

Fig. 14 is an enlarged fragmentary plan view of one of the springs shown in Fig. 13 and the mounting means therefor.

Fig. 15 is an enlarged side view of one of the springs and mountings therefor shown in Figs. 13 and 14, parts thereof being shown in section, and other parts being removed to more clearly show the structure of certain elements thereof, said view being taken substantially along line 15—15 of Fig. 13.

Figure 5:
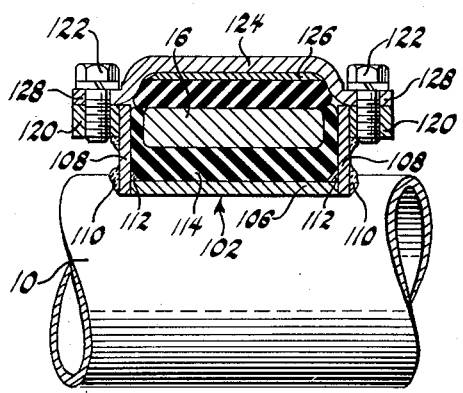
Fig. 5 is a sectional end view of the spring and the mounting therefor, said view being taken substantially along line 5—5 of Fig. 4.

Referring to the drawings, the numeral 2 indicates the rear portion of the frame of a motor vehicle 4. A road wheel 6 is disposed at either side of frame 2, each of which being operatively connected to a driving axle 8, (only one road wheel and axle being shown). The axles 8 are enclosed within tubular housings 10 connected at their inner ends to a differential gear housing 12. A drive shaft 14 extending lengthwise of the vehicle is operatively connected in the usual fashion to the differential gearing enclosed within housing 12. The frame 2 is supported on a pair of leaf springs 16 operatively connected to said frame and also to axle housing 10, as will appear more fully hereinafter.

The frame 2 comprises the usual longitudinally extending side rails 18 and cross members 20, only one of the latter of which being shown. A shock absorber 22 is mounted at each side of the frame 2. Each shock absorber 22 is pivotally supported on a bolt or pin means 26 suitably secured to the lower end of a bracket 24 welded or otherwise secured to an associated axle housing 10. The upper end of each shock absorber 22 is pivoted to a suitable bracket (not shown), mounted on the associated side rail 18 of frame 2. The springs 16 and the means for attaching the latter to the frame 2 and also to the axle housings 10 are identical and, accordingly, a detailed description of one will suffice for both.

Figure 3:
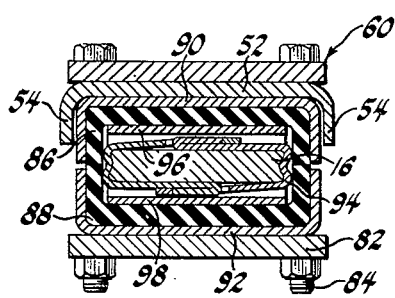
Fig. 3 is a sectional view taken substantially along line 3—3 of Fig. 2.

Each spring 16, in the embodiment shown in Figs. 1 to 3, is of single leaf construction and is provided with a loop or eye at each end thereof, as shown at 28 and 30. The forward eye 28 of spring 16 is mounted on a resilient bushing 32 provided on a pin 34 secured at the ends thereof in a supporting bracket 36 which in turn is welded or otherwise secured to the side rail 18 of frame 2. The other eye 30 is likewise mounted on a rubber bushing (not shown), provided on a shackle bolt 38 mounted in the usual shackle links 40 pivoted at 42 to side rail 18 near the rearwardly disposed end thereof. Each spring 16 is provided with substantially semicircular loop 44 intermediate the ends thereof which partially surrounds the lower portion of axle housing 10 and is disposed in spaced relation therewith.

Welded or otherwise secured to axle housing 10 is a spring supporting bracket 46. Bracket 46 comprises a substantially U-shaped intermediate portion 48 which extends around the under and a substantial portion of the side surfaces of axle housing 10 and is secured thereto by welding as shown at 49.

The upper ends of the legs of U-shaped portion 48 of bracket 46 terminate in relatively flat, substantially horizontally disposed spring supporting portions 50 and 52. Substantially vertical flanges 54 extend downwardly from the side edges of flat portions 50 and 52 and U-shaped portion 48, the flanges 54 being relatively deep as shown at 56 adjacent the U-shaped portion 48 and tapering as they approach the outer ends of flat portions 50 and 52. Spring 16 extends between the flanges 54 of bracket 46, as shown more particularly in Figs. 1 and 2, and is secured at spaced points disposed at opposite sides of axle housing 10 by a pair of clamps indicated generally at 58 and 60. Clamp 58, which is disposed between axle housing 10 and the point of attachment of the forward end of spring 16 to the frame 2, is located somewhat closer to the said housing than clamp 60 and comprises upper and lower clamp plates 62 and 64, respectively, and four clamping bolts 66. Two bolts 66 are disposed adjacent each side edge of spring 16 and consequently no bolt holes are required to be provided in said spring. In order to cushion the action of spring 16 and to lend flexibility thereto during operation, spring pads 68 and 70 are provided at the upper and lower surfaces thereof. Substantially U-shaped retainers 76 and 78 partially surround the outer portions of pads 68 and 70, respectively, and abut the under surfaces of spring support 50 and clamp member 64, as shown in Fig. 2. It will be observed that while spring 16 is attached by clamp 58 to bracket 46 it is not positively secured thereto and consequently during operation said spring may slide between pads 68 and 70.

Clamp 60 is generally similar in construction to clamp 58 and also consists of upper and lower substantially rectangular clamping members 80 and 82 and four bolts 84. Resilient pads 86 and 88 are provided at opposite sides of spring 16 and have substantially U-shaped retainers 90 and 92 disposed around the outer extremities thereof. In clamp 60 also two bolts 84 are disposed adjacent each side edge of spring 16 so that no bolt holes are necessary in said spring. Mounted around spring 16 and disposed within recesses provided in blocks 86 and 88 is a retaining clip 94. The clip 94 may be of any suitable construction and is provided to locate spring 16 with respect to axle housing 10 and in operation prevents movement of said spring and the axle housing at this point of attachment of said spring to bracket 46. For a complete disclosure of such a clip or spring retaining means reference may be had to the co-pending application of Robert B. Burton Serial No. 41,312, filed July 29, 1948, now Patent No. 2,643,111 dated June 23, 1953. Substantially U-shaped retaining members 96 and 98 are disposed within the recesses provided in blocks 86 and 88 and snugly fit around the side edges of clip 94, as shown in Fig. 2. It therefore is seen that when the bolts 66 and 84 of clamps 58 and 60 are tightened, spring 16 will be effectively attached at widely spaced points on supporting bracket 46 in such a manner that the neutral axis thereof lies slightly below the axis 100 of axle 8 and housing 10 and the loop 44 is disposed in spaced relation with said housing.

The different spacing of the clamps 58 and 60 from the center of the axle is in proportion with the different lengths of spring extending from the center line of said axle to the points of attachment of said spring to the frame 2 and consequently constant bending moment of the said spring is produced in the region thereof disposed between the said clamps.

It is seen that during operating periods, spring 16 will be in compression and since the center line thereof is substantially in line with the axis of axle 8 the tendency of spring and axle to wind-up will be reduced to a minimum. It is also seen that by providing a space between the loop 44 of spring 16 and the axle housing 10, the portion of the spring disposed between clamps 58 and 60 will also be effective and, accordingly, substantially the entire length of the spring will be effective to resiliently support the load. It is also apparent that by virtue of the wide divided clamp the wind up and lateral stiffness of the assembly is increased without impairing the ride motion of the spring.

Figure 4:
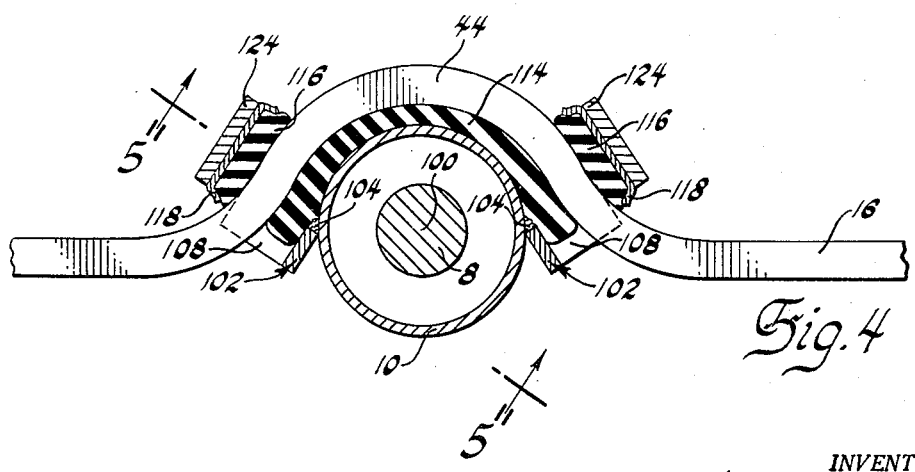
Fig. 4 is a view similar to Fig. 2 but showing a modified construction.

Figs. 4 and 5 disclose a modified construction wherein the loop 44 of spring 16 is disposed around the upper portion of axle housing 10. In this construction a pair of supporting brackets 102 are welded as shown at 104 or otherwise secured to the axle housing 10 at opposite sides thereof. Each bracket 102 consists of a base plate 106 and a pair of vertically disposed substantially parallel side plates 108. If preferred, however, the brackets 102 may be made of integral channel construction instead of being fabricated as shown. The side plates 108 are welded to the housing 10, as shown at 110, and also to the base plate 106, as shown at 112. Extending around the upper portion of axle housing 10 and over a portion of the base plates 106 of brackets 102 is a relatively heavy pad 114 of resilient material such as rubber which is compressed into substantially U-shaped cross sectional form when assembled on the axle housing 10. As shown in Fig. 4, the arcuate portion 44 of spring 16 bears against pad 114. Disposed on the opposite sides of spring 16 are a pair of heavy pads 116 of resilient material such as rubber and disposed between the outer surfaces of said pads are substantially U-shaped retaining members 118. A pair of lateral extensions 120 are secured by welding or otherwise, to the upper outer surfaces of the vertical side plates 108 and are provided with tapped openings for receiving clamp bolts 122. Mounted on retaining members 118 and overlying the side edges of pads 116 are a pair of U-shaped clamp members 124. Each of the legs of each clamp member 124 terminates in an outwardly extending flange 128 having openings therein in alignment with the associated threaded openings provided in projections 120. It therefore is seen that by tightening the bolts 122 the pads 114 and 116 are drawn tightly into engagement with the upper and lower surfaces of the spring 16. The clamps 124 are disposed at opposite sides of the arcuate portion 44 of spring 16 and, accordingly, said spring is effectively held in position. In this construction, like that shown in Figs. 1 to 3, the longitudinal center line of spring 16 substantially intersects the axis 100 of axle 8 and axle housing 10. Accordingly, during movement of the vehicle in either direction or when the brakes are applied the spring 16 will be in compression. It is also seen that since the center line of the spring is substantially in line with the axis of the axle and its housing, wind up is materially reduced. Undesirable axle hop due to wind up is thus minimized, if not altogether eliminated. In this type of mounting, also, wind up and lateral stiffness of the assembly is also increased without impairing the ride motion of the spring. The pad 114 being flexible will enable the arcuate portion 44 of the spring to move somewhat toward the axle housing 10 and, accordingly, in this construction also substantially the entire length of the spring is utilized for resiliently supporting the vehicle. In this type of construction the loop 44 locates the spring 16 on axle housing 10 and therefore no securing clip such as that shown at 94 in Figs. 2 and 3 are required.

Figs. 6 to 9 illustrate a further modification of the present invention. The constructions shown in Figs. 1 to 5 are adapted primarily for use in connection with the Hotchkiss type of suspension wherein the springs themselves effect driving of the vehicle and also take up the wind up forces. The invention, however, as shown in Fig. 6 is also adapted for use in connection with torque arm or torque tube types of constructions. The structure shown in Fig. 6 is generally similar to that shown in Fig. 1 except that a torque arm 130 is provided to relieve the spring 16 of all wind up forces. The frame 2 shown in Fig. 6 also comprises spaced side rails 18 and cross rails 20 and in addition shows a portion of an X-frame member 132 rigidly connected to the side rails 18 intermediate the ends thereof. A supporting bracket 134 is welded or otherwise secured to X-member 132 and has supported thereon a supporting pivot pin 136 having a resilient bushing 138 provided thereon. The upper end of a link pin 139 is mounted on bushing 138. The inner end of torque arm 130 is provided with a rounded attaching portion 140 which engages a flexible bushing 141 provided on link pin 139. The rearwardly disposed end 142 of torque arm 130 is secured by bolts 144 or other fastening means to differential housing 12, rubber bushings (not shown) being provided on said bolts to cushion said torque arm. The springs 16 shown in Figs. 6 to 9 are similar to the springs shown in Fig. 1 and are attached at the ends thereof to the frame 2 in the same manner as the spring 16 shown therein. The method of attaching spring 16 to the axle housing 10, however, is different and will now be described in detail.

Figure 9:
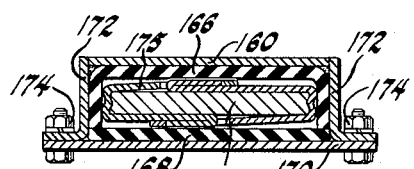
Fig. 9 is a sectional view taken substantially along line 9—9 of Fig. 7.

As shown in Fig. 7, a spring supporting bracket 146 is mounted on axle housing 10 and has an arcuate portion 148 provided centrally thereof which is substantially concentric with housing 10 and extends about a substantial portion of said housing. A heavy pad 150 of rubber or other flexible material is disposed between housing 10 and arcuate portion 148. Bracket 146 is provided with substantially flat spring supporting portions 154 and 156 and with vertical side walls 152 which are secured by welding to arcuate portion 148 and to said spring supporting portions at the side edges thereof. As shown in Fig. 7 flat portion 154 is secured by welding, as shown at 158, to the outer side of arcuate portion 148 and has formed at the forwardly disposed end thereof a substantially U-shaped clamp portion 160. The substantially flat member 156 extending rearwardly from arcuate portion 148 is integral with the said arcuate portion and is formed by bending the lower end of the latter, as shown at 162, outwardly. The rearwardly disposed end of member 156 has also formed thereon a substantially U-shaped clamp portion 164. The loop 44 of spring 16 extends partially around the under side of axle housing 10 and the portion thereof adjacent the forward end of said loop is secured to the supporting portion 154 of bracket 156. Pads 166 and 168 consisting of rubber or other resilient material are disposed at the upper and lower sides of spring 16, the outer surface of pad 166 engaging clamp member 160. The outer surface of pad 168 is engaged by a complementary clamp element 170. As shown in Fig. 9, the opposite side edges of clamp portion 160 have secured thereto by welding the vertically disposed legs of L-shaped members 172 which retain a portion of the pad 166 bent around the spring 16. Resilient padding is thereby provided completely around spring 16. The lower arms of L-shaped members 172 are provided with apertures for receiving clamp bolts 174. When the bolts 174 are tightened, the pads 166 and 168 are tightly drawn into engagement with spring 16. A retaining clip 175 extending around spring 16 and seating in recesses provided in rubber pads 166 and 168 locate the spring with respect to housing 10 and prevent relative movement of said spring and housing 10 at this point. The portion of spring 16 disposed adjacent to the other end of loop 44 is clamped to the spring supporting portion 156 of bracket 146 in similar fashion. Heavy rubber pads 176 and 178 are provided on opposite sides of spring 16 and urged tightly into engagement with said spring by clamp portion 164 and a companion clamp member 180. Bolts 182 similar to the bolts 174 shown in Fig. 9 draw clamp members 164 and 180 toward each other to effectively attach spring 16 to spring supporting member 156. Pad 176 like pad 166 extends around the side edges of spring 16 whereby resilient material completely surrounds the spring at the points of attachment to the supporting bracket 146. Inasmuch as spring 16 is not secured to bracket 146 by a clip 175 or otherwise at this point of attachment, said spring may slide in blocks 176 and 178 relative to bracket 146 during operation of the vehicle.

Figure 8:
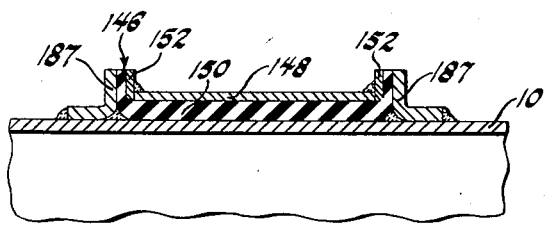
Fig. 8 is a sectional view taken substantially along line 8—8 of Fig. 7.

As shown more clearly in Fig. 8, spaced L-shaped members 187 are secured to axle housing 10 by welding. The upper vertical flanges of members 187 are spaced slightly from the side walls 152 of bracket 146 and a portion of the pad 150 extends therebetween as shown in Fig. 8. The members 187 therefore guide bracket 146 and prevent axial movement thereof along axle housing 10. In this construction it will be observed that the spring supporting bracket 146 is not welded or otherwise rigidly attached to the axle housing 10. Instead it is swiveled thereon and is adapted to rock about the axis 100 of housing 10 during operation of the vehicle. As previously pointed out, torque arm 130 takes up all the wind up forces and therefore the springs 16 in this construction function only to resiliently support the vehicle and form the driving connection between axle housing 10 and frame 2. The pivotal link 139 permits longitudinal movement of arm 130 due to angular movement of the latter when housing 12 is raised or lowered during operation of the vehicle. It is seen that inasmuch as the spring support 146 may rock about axle housing 10 substantially no axle wind up occurs. The neutral axis or center line of spring 16 in this construction also substantially intersects the axis of the axle housing 10 and, accordingly, the said spring will always be in compression and the driving forces will be at or near the said neutral axis of said spring.

Figure 10:
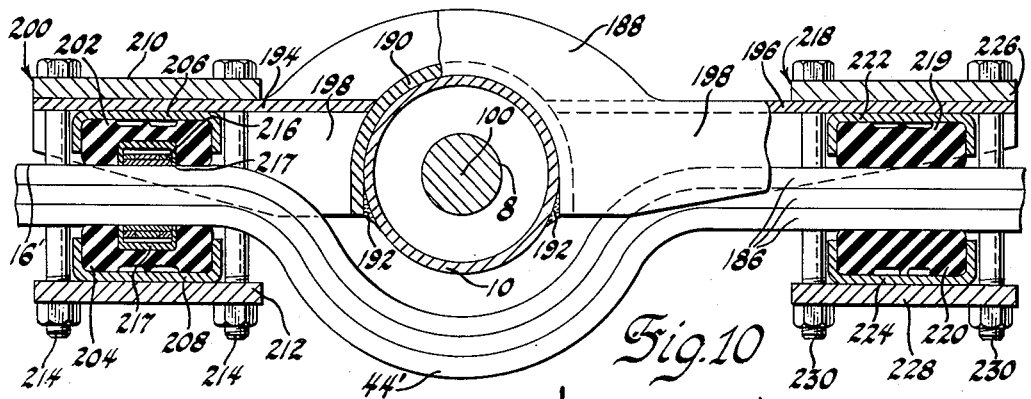
Fig. 10 is a side elevational view, partly in section, of a portion of a spring of a further modified construction and the means for clamping the latter to the axle housing of the vehicle.

Fig. 10 shows a still further modification of the invention. In this construction each spring 16' is formed of a plurality of leaves 186 instead of a single leaf as shown in the previously described embodiments of the invention. In this construction the opposite ends of the top leaf 186 of each spring is attached to the frame of the vehicle in the usual fashion as shown in Figs. 1 and 6. The intermediate portion of spring 16' is clamped at spaced points to a supporting bracket 188. Bracket 188 is constructed somewhat on the order of bracket 46 shown in Fig. 2 but is secured to the upper portion of axle housing 10 instead of beneath it. Bracket 188 also comprises an arcuate portion 190 which surrounds the upper portion of axle housing 10 and is secured to the opposite sides thereof by welding as shown at 192. Bracket 188 also comprises a pair of flat forwardly and rearwardly extending spring supporting members 194 and 196 which are secured by welding to the outer surface of arcuate portion 190. Bracket 188 also comprises spaced vertically disposed side walls 198 which are secured to the side edges of flat members 194 and 196 and arcuate member 190 by welding. The portion of spring 16' disposed forwardly of the loop 44' thereof is secured to bracket 188 by a clamp 200. Rubber pads 202 and 204 engage the upper and lower surfaces of spring 16' and the outer surfaces thereof seat in substantially U-shaped retaining members 206 and 208, respectively. The pads 202 and 204 are brought into tight engagement with spring 16' by upper and lower clamp members 210 and 212 through which four bolts 214 extend. The bolts 214 are disposed on either side of spring 16' and when tightened effectively secure the spring 16' in position. A retaining clip 216 of the general type disclosed in the previously referred to application Serial No. 41,312 surrounds and is secured to spring 16' and extends into recesses provided at the inner surfaces of pads 202 and 204. Substantially U-shaped filler members 217 lie between clip 216 and the walls of the recesses in pads 202 and 204 as shown in Fig. 10. Clip 216 is provided to locate spring 16' with respect to axle housing 10 and prevent relative movement between said spring and housing at this point of attachment.

The portion of spring 16' disposed rearwardly of the loop 44' thereof is also secured to bracket 188 by a clamp 218. Resilient pads 219 and 220 engage the upper and lower surfaces of spring 16' and are retained in position by substantially U-shaped retaining members 222 and 224, respectively. Clamp 218 comprises upper and lower clamp plates 226 and 228 and four bolts 230 which when tightened urge the pads 219 and 220 tightly into engagement with the upper and lower surfaces of spring 16'. Spring 16' is not secured against relative movement with respect to the bracket at this point of attachment and therefore may slide between pads 219 and 220 during operation of the vehicle.

The multi-leaf spring shown in Fig. 10 may be used to advantage where unusually heavy loads are to be supported thereby. It will be observed that the center line or neutral axis of the upper leaf 186 of spring 16' substantially intersects the axis 100 of axle 8 and axle housing 10 and, accordingly, in this structure also wind up is reduced to a minimum. In this construction also, by clamping the spring to the axle housing bracket at widely spaced points both the wind up and lateral stiffness of the assembly is greatly enhanced. Except for the multiple leaf construction, the spring 16' shown in Fig. 10 is generally similar to the springs described heretofore and the device as a whole functions in a manner generally similar as the construction shown in Figs. 1 to 3.

Figure 11:
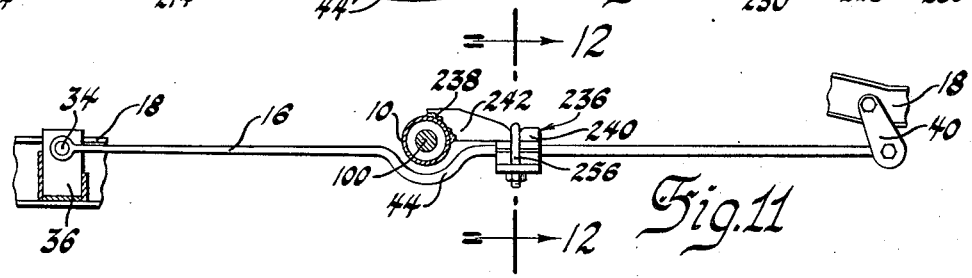
Fig. 11 is a side elevational view of a spring and mounting means therefor of a further modified construction and, Fig. 12 is an end view, partly in section, taken substantially along line 12—12 of Fig. 11.
Figure 12:
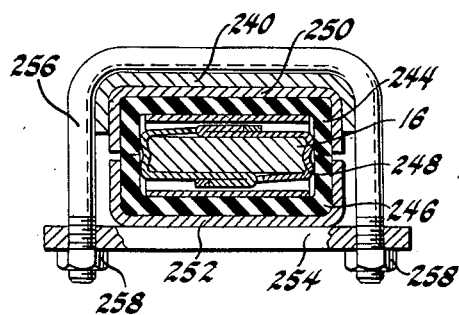

Figs. 11 and 12 show a still further modification of the invention. In this construction the spring 16 is attached at the opposite ends thereof to the frame of the vehicle in the usual manner, as shown in Figs. 1 and 6, and has an arcuate loop 44 intermediate its ends which underlies and surrounds a portion of the axle housing 10. As shown in Fig. 11, a forwardly extending supporting bracket 236 is secured by welding as shown at 238, to the axle housing 10. Bracket 236 is also provided with a relatively flat spring supporting portion 240 and side walls 242. A pair of resilient rubber pads 244 and 246 are disposed at the upper and lower surfaces of spring 16 and are held against relative movement with respect to said spring by an inner retaining clip 248 and outer substantially U-shaped retainers 250 and 252. The outer end of flat supporting portion 240 is substantially U-shaped in cross section as shown in Fig. 12 and engages the top and side portions of retainer 250. A clamp plate 254 engages the lower retainer 252. A substantially U-shaped strap or bolt 256 extends around the unit and the lower ends thereof extend through apertures provided in clamp plate 254. When the nuts 258 on bolt 256 are tightened, the resilient pads 244 and 256 are tightly drawn into engagement with the upper and lower surfaces of spring 16. This construction is somewhat more flexible than those described hereinbefore since the spring 16 is attached to the axle housing only at one point. This construction is employed in constructions wherein torque arms are utilized to take up all the wind up forces so that the spring merely supports the load and forms the driving connection between the axle housing and frame. In this construction it will also be observed that the spring swivels about the point of attachment to the bracket rather than about the axle as is done in the construction shown in Figs. 6 and 7.

It will be observed that in this construction also the center longitudinal center line of spring 16' substantially intersects the axis 100 of axle housing 10 and, accordingly, the said spring is in compression during operation of the vehicle and that substantially the entire length of said spring is utilized to resiliently support the load.

Figs. 13 to 15 illustrate a further modification of the invention wherein the suspension springs are shown mounted in operative relation with the De Dion type of axle construction. As shown in Fig. 13, a pair of road wheels 263 are driven by a pair of live axles 264 connected by universal joints 266 to one end of stub shafts 268 journaled in a differential gear casing 270 and driven by the differential gearing not shown, contained therein. The other ends of axles 264 are connected by similar differential joints, not shown, mounted within housings 272 disposed adjacent wheels 263 and to which the wheel spindles, not shown, for driving said wheels are operatively connected. The opposite ends of a De Dion type of axle 274 are welded or otherwise rigidly secured to housings 272. The sections 275 and 276 of axle 274 are threadedly engaged near their inner ends as shown at 278 so that each section may turn slightly relative to the other during rising or falling movement of the wheels 263. The central portion of axle 274 is connected by a series of links and levers indicated generally at 280 to the longitudinally extending side rails 18 of the vehicle frame. De Dion axle constructions of the type just described are known in the art and for a complete description of such a construction reference may be had to the co-pending application of Charles A. Chayne, S. N. 211,476, filed February 17, 1951, now Patent No. 2,732,903, dated January 31, 1956, assigned to General Motors Corporation. Instead of providing an axle 274 comprised of two sections 275 and 276, a single rigid axle may also be utilized if it is so desired. As in the previously described embodiments, the suspension spring 16 and the mounting therefor disposed at each side of the vehicle are identical in construction and therefore a detailed description of one will suffice for both. Bolted or otherwise secured to the vertical flange 282 of housing 272 is a spring supporting bracket 284. Bracket 284 comprises spaced vertical side walls 286 and 287 and an arcuate bottom wall 288 which terminates at the ends thereof in flat seats 290 and 292 for the lower spring pads 294 and 296 for spring 16. As shown more particularly in Fig. 15, portions of the axle 274 disposed adjacent housings 272 are cut away to receive portions of brackets 284 and the latter are then secured to said axle by welding as shown at 298. The brackets 284, accordingly, are secured to axle 274 and the side walls 286 or 287 thereof, as the case may be, are secured to the vertical flanges 282 of housings 272 by bolts 300.

A pair of resilient pads 302 and 304 are mounted on spring 16 above pads 294 and 296, respectively, and are held in position thereon by substantially inverted U-shaped clamp members 306 and 308. Clamp members 306 and 308 are provided with substantially U-shaped recesses at the ends thereof for accommodating the upper strap portions of substantially U-shaped clamp bolts 310. By tightening the nuts 312 the pads 294, 296, 302, and 304 are drawn tightly into engagement with the spring 16. Pad retainers 314 and 316 are provided at the opposite sides of pads 294 and 296, respectively, to prevent lateral movement of said pads. Pads 294 and 302 are provided with transverse recesses therein for receiving a retaining clip 318 similar to the retaining clips previously described. Retaining members 320 and 322 are mounted in the recesses provided in spring pads 302 and 294 and substantially surround the retaining clip 318. In this construction, like that shown in the previously described embodiments of the invention, the spring 16 is in compression during driving and braking actions of the vehicle and the center line thereof is disposed in substantial alignment with the center line of the axle 264. All of the advantages previously described for a spring of this structure and the mounting therefor are also present in this embodiment as well.

The various embodiments shown herein illustrate springs associated with the rear axles of the vehicle. It is apparent, however, that springs of the character disclosed herein are equally adapted for use and mounting on front axles as well. The spring suspensions herein described are also adapted to be mounted on wheel supporting members other than the axles and axle housings shown herein.

From the foregoing description it is seen that simplified and highly improved spring suspensions have been provided. By the novel construction of the springs and the means for mounting them on the axle housing, the effective length of springs of given dimensions is increased. It is also seen that by providing a divided clamp construction for the spring the windup and lateral stiffness of the axle assembly is increased without impairing the ride motion of the spring. It is also apparent that in the present constructions the roll center of the vehicle might be raised and also disposed at or near the axis of the axle, thereby reducing forced or resonant and side shake motion of the axle assembly. It is also manifest that by providing a spring construction wherein the center line of the spring substantially intersects the axis of the axle housing the driving forces are at or near the center line of the said spring and consequently windup is reduced to a minimum and the tendency of the axle to power or brake hop is materially reduced.

While several embodiments have been shown and described it is apparent that other and further embodiments may be made without departing from the invention. It therefore is to be understood that the invention is to be limited only by the scope of the claims which follow.

What is claimed is:

1. In a device of the class described, the combination of a vehicle frame, an axle housing, a load carrying single leaf spring, means for pivotally attaching the ends of said spring to said frame, a loop formed in said spring intermediate the ends thereof partially surrounding and lying in spaced relation with said housing, and means for attaching said spring to said housing in such a manner that substantially the entire length of said spring is effective for resiliently supporting the load.

2. In a device of the class described, the combination of a vehicle frame, an axle housing, a load carrying leaf spring, means for pivotally attaching the ends of said spring to said frame, a loop formed in said spring intermediate the ends thereof partially surrounding said housing, a bracket mounted for rocking movement on said housing, supporting means secured to said bracket and disposed at opposite sides of said housing, and means for clamping said spring at spaced points to said supporting means in such a manner that the neutral axis of said spring lies substantially in alignment with the axis of said housing.

3. In a device of the class described, the combination of a vehicle frame, an axle housing, a load carrying leaf spring, means for pivotally attaching the ends of said spring to said frame, a loop formed in said spring intermediate the ends thereof partially surrounding said housing, a bracket mounted for rocking movement on said housing, supporting means secured to said bracket and disposed at opposite sides of said housing, means for clamping said spring at spaced points to said supporting means in such a manner that said loop lies in spaced relation with said housing, and the center line of said spring lies substantially in alignment with the axis of said housing, resilient pad means disposed between said loop and said housing, and means for preventing axial movement of said bracket in either direction along said housing.

4. In a device of the class described, the combination of a vehicle frame, an axle housing, a load carrying leaf spring, means for pivotally attaching the ends of said spring to said frame, a loop formed in said spring intermediate the ends thereof partially surrounding said housing, a bracket secured to said housing, spring supporting means on said bracket disposed at opposite sides of said housing, and means for clamping said spring at spaced points to said supporting means in such a manner that said loop lies in spaced relation with said housing and the longitudinal center line of said spring substantially intersects the axis of said housing.

5. In a device of the class described, the combination of a vehicle frame, an axle housing, a load carrying leaf spring, means for pivotally attaching the ends of said spring to said frame, a loop formed in said spring intermediate the ends thereof partially surrounding said housing, a bracket secured to said housing, spring supporting means on said bracket disposed at opposite sides of said housing, means for clamping said spring at spaced points to said supporting means in such a manner that said loop lies in spaced relation with said housing and the center line of said spring substantially intersects the axis of said housing, and resilient means engaging the opposite sides of said spring at the points of attachment thereof to said supporting means.

6. In a device of the class described, the combination of a vehicle frame, an axle housing, a load carrying leaf spring, means for pivotally attaching the ends of said spring to said frame, a loop formed in said spring intermediate the ends thereof and disposed beneath and partially surrounding said housing, a bracket secured to said housing, spring supporting means on said bracket disposed at opposite sides of said axle housing and means for resiliently clamping the portions of said spring disposed near the opposite ends of said loop to said supporting means.

7. In a device of the class described, the combination of a vehicle frame, an axle housing, a load carrying leaf spring, means for pivotally attaching the ends of said spring to said frame, a loop formed in said spring intermediate the ends thereof and disposed above and partially surrounding said housing, a pair of brackets secured to said housing at opposite sides thereof, clamp means for securing said spring to said brackets, resilient pad means disposed between said loop and said housing, and additional resilient pad means engaging the other side of said spring at the points of attachment thereof to said brackets by said clamp means.

8. In a device of the class described, the combination of a vehicle frame, an axle housing, a load carrying leaf spring, means for pivotally attaching the ends of said spring to said frame, a loop formed in said spring intermediate the ends thereof partially surrounding said housing, a bracket secured to said housing and extending forwardly thereof, and means for clamping said spring to said bracket only at a point disposed near the forwardly disposed end of said bracket in such a manner that said loop lies in spaced relation with said housing and the neutral axis of said spring substantially intersects the axis of said housing.

9. In a device of the class described, the combination of a vehicle frame, a wheel supporting member disposed beneath said frame, a load carrying leaf spring, means for pivotally attaching the ends of said spring to said frame, a loop formed in said spring intermediate the ends thereof partially surrounding said wheel supporting member, and means for attaching said spring at widely spaced points to said wheel supporting member thereby enhancing the windup and lateral stiffness of said spring.

10. In a device of the class described, the combination of a vehicle frame, a wheel supporting member disposed beneath said frame, a load carrying leaf spring, means for pivotally attaching the ends of said spring to said frame, a loop formed in said spring intermediate the ends thereof partially surrounding and lying in spaced relation with said wheel supporting member, and means for attaching said spring to said wheel supporting member in such a manner that substantially the entire length of said spring is effective for resiliently supporting the load.

11. In a device of the class described, the combination of a vehicle frame, a road wheel, a driving axle for said wheel, a rigid supporting axle for said wheel spaced from said driving axle, a spring, means for pivotally attaching the said spring to said frame, a loop formed in said spring intermediate the ends thereof and partially surrounding said driving axle, a spring supporting bracket secured to said wheel supporting axle, and means for attaching said spring to said bracket at widely spaced points thereby enhancing the windup and lateral stiffness of said spring and wheel supporting structure.

References Cited in the file of this patent

UNITED STATES PATENTS

| | | |
|---|---|---|
| 922,169 | Lieb | May 18, 1909 |
| 949,308 | Smith | Feb. 15, 1910 |
| 1,561,542 | Houdaille | Nov. 17, 1925 |
| 2,083,085 | Palmer | June 8, 1937 |
| 2,174,320 | Gonard | Sept. 26, 1939 |

FOREIGN PATENTS

| | | |
|---|---|---|
| 617,783 | Great Britain | Feb. 11, 1949 |